United States Patent
Savard et al.

(10) Patent No.: US 12,540,550 B2
(45) Date of Patent: Feb. 3, 2026

(54) TIE SHAFT FOR ENGINE ROTATING ASSEMBLY

(71) Applicant: Pratt & Whitney Canada Corp., Longueuil (CA)

(72) Inventors: Philippe Savard, Terrebonne (CA); Guy Lefebvre, St-Bruno (CA); Remy Synnott, St-Jean-sur-Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/772,879

(22) Filed: Jul. 15, 2024

(65) Prior Publication Data
US 2026/0015942 A1   Jan. 15, 2026

(51) Int. Cl.
*F01D 5/02*   (2006.01)

(52) U.S. Cl.
CPC .......... *F01D 5/026* (2013.01); *F05D 2240/60* (2013.01); *F05D 2260/31* (2013.01)

(58) Field of Classification Search
CPC ......... F01D 5/026; F01D 5/02; F05D 2240/60
See application file for complete search history.

(56) References Cited

U.S. PATENT DOCUMENTS

| | | | |
|---|---|---|---|
| 7,912,587 B2 * | 3/2011 | Walters | F01D 5/027 73/66 |
| 9,896,938 B2 * | 2/2018 | Tucker | F01D 5/005 |
| 10,094,277 B2 | 10/2018 | Hanrahan | |
| 10,190,495 B2 * | 1/2019 | Laureano | F01D 21/045 |
| 11,480,071 B2 | 10/2022 | Pellerin | |
| 2009/0025461 A1 | 1/2009 | Walters | |
| 2010/0124495 A1 | 5/2010 | Bifulco | |
| 2012/0107098 A1 | 5/2012 | Tirone, III | |
| 2016/0146103 A1 | 5/2016 | Muldoon | |
| 2018/0334907 A1 | 11/2018 | Perrier | |

OTHER PUBLICATIONS

EP Search Report for EP Patent Application No. 25189709.6 dated Dec. 8, 2025.

* cited by examiner

Primary Examiner — Michael L Sehn
(74) Attorney, Agent, or Firm — Getz Balich LLC

(57) ABSTRACT

During a disassembly method, a nut is unthreaded from a tie shaft. Prior to the unthreading of the nut, the tie shaft is threaded into a first rotating structure, a second rotating structure is mounted to the first rotating structure by a first tight fit connection, a third rotating structure is mounted to the second rotating structure by a second tight fit connection, and the second rotating structure and the third rotating structure are axially stacked and secured between the first rotating structure and the nut. The tie shaft is unthreaded from the first rotating structure. The tie shaft is axially translated to abut a shoulder of the tie shaft against an axial distal end of the second rotating structure. The tie shaft is further axially translated to disconnect the second rotating structure from the first rotating structure at the first tight fit connection and pull the second rotating structure away from the first rotating structure while the third rotating structure remains mounted to the second rotating structure by the second tight fit connection.

16 Claims, 10 Drawing Sheets

TIE SHAFT FOR ENGINE ROTATING ASSEMBLY

TECHNICAL FIELD

This disclosure relates generally to a powerplant engine and, more particularly, to a tie shaft for an engine rotating assembly.

BACKGROUND INFORMATION

A powerplant engine such as a gas turbine engine may include a tie shaft for coupling various rotating structures together. Various types and configurations of tie shafts are known in the art. While these known tie shafts have various benefits, there is still room in the art for improvement.

SUMMARY

According to an aspect of the present disclosure, an apparatus may be provided for an engine. This apparatus may include a first rotating structure, a second rotating structure, a third rotating structure, a tie shaft and a nut. The first rotating structure includes a first structure bore and a first structure shaft. The second rotating structure includes a second structure bore, a second structure shaft, a second structure coupler and a bladed second structure rotor axially between the second structure shaft and the second structure coupler. The second structure shaft is mounted to the first structure shaft at a shaft-to-shaft tight-fit connection. The third rotating structure includes a third structure bore, a third structure coupler, a third structure mount and a bladed third structure rotor axially between the third structure coupler and the third structure mount. The third structure coupler is mounted to the second structure coupler at a coupler-to-coupler tight-fit connection. The tie shaft projects axially through the third structure bore, the second structure bore and into the first structure bore. The tie shaft is attached to the first structure shaft at a first threaded connection. The tie shaft includes a protrusion that projects radially outward into a gap axially between the first structure shaft and the second structure shaft. The nut is mounted to the tie shaft at a second threaded connection and is abutted axially against the third structure mount. The second rotating structure and the third rotating structure are stacked axially between the first rotating structure and the nut.

According to another aspect of the present disclosure, an apparatus is provided for an engine. The apparatus includes a rotating assembly rotatable about an axis. The rotating assembly includes a first rotating structure, a second rotating structure and a tie shaft. The first rotating structure includes a first structure bore and a first structure shaft. The second rotating structure includes a second structure bore, a second structure shaft, a second structure coupler and a bladed second structure rotor axially between the second structure shaft and the second structure coupler. The second structure shaft is mounted to the first structure shaft at a shaft-to-shaft tight-fit connection. The second structure shaft has a second structure shaft inner radius at a location axially aligned with the shaft-to-shaft tight-fit connection. The tie shaft projects axially through the second structure bore and into the first structure bore. The tie shaft is attached to the first structure shaft at a threaded connection. The tie shaft includes a protrusion that projects radially outward into a gap axially between the first structure shaft and the second structure shaft. The protrusion includes a guide and a rim projecting radially out from the guide. The guide has a guide outer radius that is smaller than the second structure shaft inner radius. The rim has a rim outer radius that is larger than the second structure shaft inner radius.

According to still another aspect of the present disclosure, a disassembly method is provided during which a nut is unthreaded from a tie shaft. Prior to the unthreading of the nut, the tie shaft is threaded into a first rotating structure, a second rotating structure is mounted to the first rotating structure by a first tight-fit connection, a third rotating structure is mounted to the second rotating structure by a second tight-fit connection, and the second rotating structure and the third rotating structure are axially stacked and secured between the first rotating structure and the nut. The tie shaft is unthreaded from the first rotating structure. The tie shaft is axially translated to abut a shoulder of the tie shaft against an axial distal end of the second rotating structure. The tie shaft is further axially translated to disconnect the second rotating structure from the first rotating structure at the first tight-fit connection and pull the second rotating structure away from the first rotating structure while the third rotating structure remains mounted to the second rotating structure by the second tight-fit connection.

The tie shaft may include a protrusion that projects radially outward into a gap. The protrusion may include the shoulder of the tie shaft. The gap may be formed by and may extend axially between a shoulder of the first rotating structure and the axial distal end of the second rotating structure. Prior to the unthreading of the tie shaft, the protrusion may be axially spaced from the shoulder of the first rotating structure and the protrusion may be axially spaced from the axial distal end of the second rotating structure.

The gap may be formed by and may extend axially between a shoulder of the first structure shaft and a distal end of the second structure shaft. The protrusion may be axially spaced from the shoulder of the first structure shaft. The protrusion may be axially spaced from the distal end of the second structure shaft.

The gap may be formed by and may extend axially between a shoulder of the first structure shaft and a distal end of the second structure shaft.

The protrusion may be axially spaced from the shoulder of the first structure shaft by a portion of the gap.

The protrusion may be axially spaced from the distal end of the second structure shaft by a portion of the gap.

During disassembly of the second rotating structure from the first rotating structure, the protrusion may be configured to axially engage the distal end of the second structure shaft to pull the second structure shaft axially apart from the first structure shaft.

A distal end of the first structure shaft may axially engage a shoulder of the second structure shaft.

During disassembly of the apparatus, the tie shaft may be configured to pull a second structure shaft axially apart from the first structure shaft while maintaining the coupler-to-coupler tight-fit connection.

The protrusion may include a guide and a rim. The rim may project radially outward from the guide into the gap.

The second structure shaft may have a second structure shaft inner radius at a location axially aligned with the shaft-to-shaft tight-fit connection. The guide may have a guide outer radius that is smaller than the second structure shaft inner radius. The rim may have a rim outer radius that is larger than the second structure shaft inner radius.

The guide may have a cylindrical outer surface axially adjacent the rim. An axial length of the cylindrical outer surface may be larger than an axial thickness of the rim.

The shaft-to-shaft tight-fit connection may be a first shaft-to-shaft tight-fit connection. The second structure shaft may also be mounted to the first structure shaft at a second shaft-to-shaft tight-fit connection that is axially offset from the first shaft-to-shaft tight-fit connection.

The second structure shaft may also be mounted to the first structure shaft at a spline connection axially between the first shaft-to-shaft tight-fit connection and the second shaft-to-shaft tight-fit connection.

The second structure shaft may also be mounted to the first structure shaft at a spline connection.

The bladed second structure rotor may be configured as a first turbine rotor. The bladed third structure rotor may be configured as a second turbine rotor.

The first rotating structure may also include a compressor rotor.

The first rotating structure, the second rotating structure and the third rotating structure may each be configured as a monolithic body.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
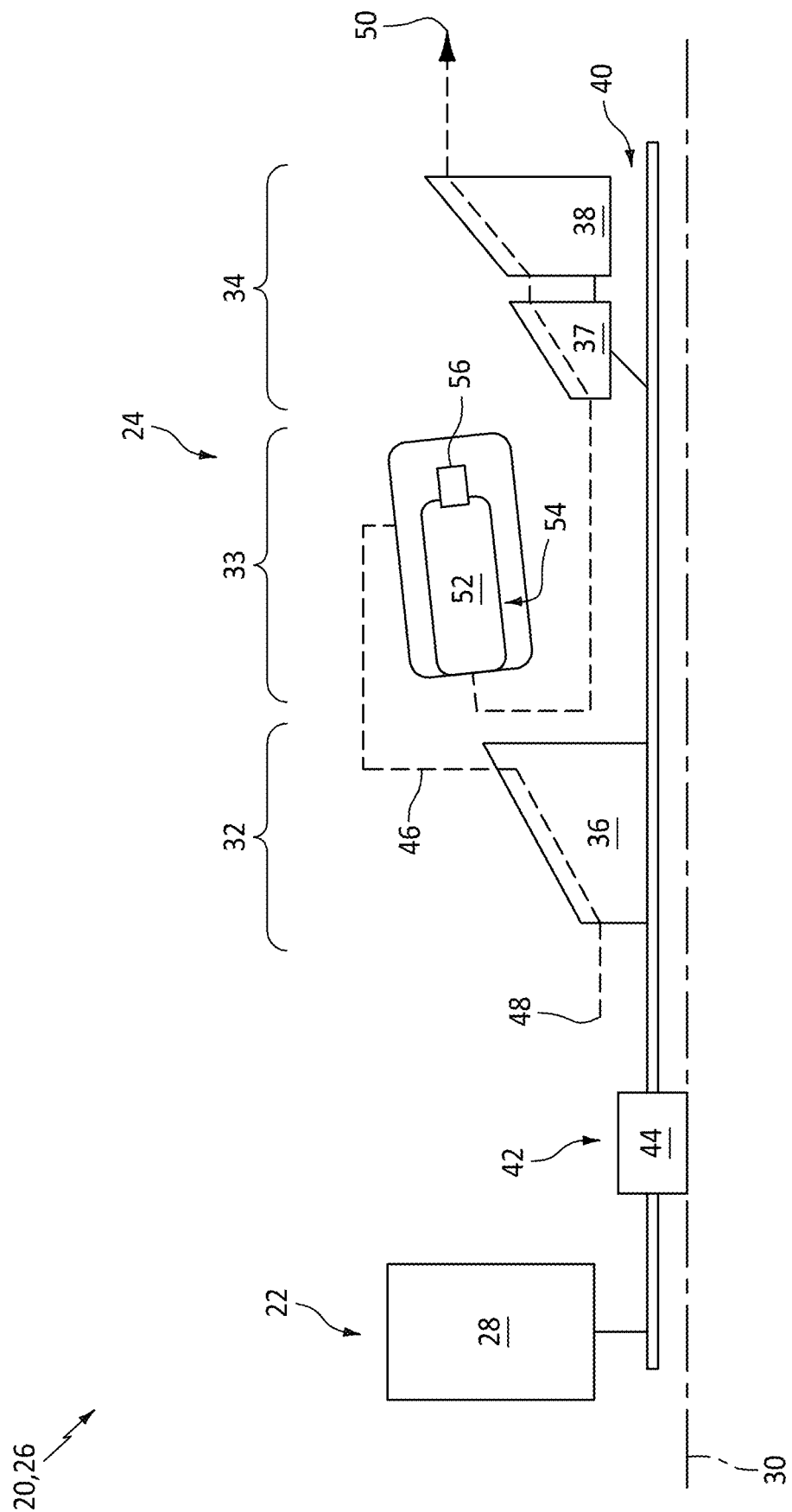
FIG. 1 is a partial schematic illustration of an aircraft powerplant.

FIG. 1 illustrates a powerplant 20 for an aircraft. The aircraft may be an airplane, a helicopter, a drone (e.g., an unmanned aerial vehicle (UAV)) or any other manned or unmanned aerial vehicle or system. The powerplant 20 may be configured as, or otherwise included as part of, a propulsion and/or lift system for the aircraft. The powerplant 20 may also or alternatively be configured as, or otherwise included as part of, an electrical power system for the aircraft. The present disclosure, however, is not limited to aircraft applications. The powerplant 20, for example, may alternatively be configured as, or otherwise included as part of, an electrical power system for ground-based operation (e.g., an industrial powerplant), or otherwise. However, for case of description, the powerplant 20 is described below as an aircraft powerplant.

The aircraft powerplant 20 of FIG. 1 includes a mechanical load 22 and a core 24 of a gas turbine engine 26, where the engine core 24 is configured to power operation of the mechanical load 22. The mechanical load 22 may be configured as or otherwise include a rotor 28 mechanically driven by the engine core 24. This driven rotor 28 may be a bladed propulsor rotor for the aircraft propulsion and/or lift system. The propulsor rotor may be an open propulsor rotor (e.g., an un-ducted propulsor rotor) or a ducted propulsor rotor. For example, where the turbine engine 26 is a turboprop engine, the open propulsor rotor may be a propeller rotor. Where the turbine engine 26 is a turboshaft engine, the open propulsor rotor may be a rotorcraft rotor such as a helicopter main rotor or a helicopter tail rotor. Where the turbine engine 26 is a turbofan engine, the ducted propulsor rotor may be a fan rotor. Alternatively, the driven rotor 28 may be configured as a generator rotor of an electric power generator for the aircraft electrical power system; e.g., an auxiliary power unit (APU) system. The present disclosure, however, is not limited to the foregoing exemplary mechanical loads nor to the foregoing exemplary turbine engines. The turbine engine 26, for example, may alternatively be configured as a turbojet engine, a propfan engine, a pusher fan engine or any other type of turbine engine operable to power the operation of the mechanical load 22 and/or generate thrust.

The turbine engine 26 extends axially along an axis 30 from a forward, upstream end of the turbine engine 26 to an aft, downstream end of the turbine engine 26. Briefly, this axis 30 may be a centerline axis of the turbine engine 26 and/or its engine core 24. The axis 30 may also be a rotational axis of one or more members of the turbine engine 26 and its engine core 24. The turbine engine 26 of FIG. 1 includes a compressor section 32, a combustor section 33 and a turbine section 34.

The compressor section 32 includes at least one bladed compressor rotor 36. The turbine section 34 includes one or more bladed turbine rotors 37 and 38. The compressor rotor 36, the first turbine rotor 37 (e.g., a first, upstream stage turbine rotor) and the second turbine rotor 38 (e.g., a second, downstream stage turbine rotor) each respectively include a rotor base (e.g., a hub or a disk) and an array of rotor blades, where the rotor blades are arranged circumferentially around and are connected to the rotor base. The rotor blades, for example, may be formed integral with or mechanically fastened, welded, brazed and/or otherwise attached to the rotor base.

The compressor rotor 36 is coupled to and rotatable with the first turbine rotor 37 and the second turbine rotor 38. The compressor rotor 36, the first turbine rotor 37 and the second turbine rotor 38 are included in an engine rotating assembly 40; e.g., a spool of the turbine engine 26 and its engine core 24. This rotating assembly 40 is coupled to the driven rotor 28 through a drivetrain 42. The drivetrain 42 may be configured as a geared drivetrain, where a geartrain 44 (e.g., a transmission, a speed change device, an epicyclic geartrain, etc.) is disposed between and operatively couples the driven rotor 28 to the rotating assembly 40 and its turbine rotors 37 and 38. With this arrangement, the driven rotor 28 may rotate at a different (e.g., slower) rotational velocity than the rotating assembly 40 and its turbine rotors 37 and 38. However, the drivetrain 42 may alternatively be configured as a direct drive drivetrain, where the geartrain 44 is omitted. With such an arrangement, the driven rotor 28 may rotate at a common (the same) rotational velocity as the rotating assembly 40 and its turbine rotors 37 and 38. Referring again to FIG. 1, the rotating assembly 40 and its bladed engine rotors 36-38 are rotatable about the axis 30, and the axis 30 is a centerline axis of the rotating assembly 40 and its bladed engine rotors 36-38.

The turbine engine 26 of FIG. 1 includes a (e.g., annular) core flowpath 46. The core flowpath 46 extends longitudinally within the turbine engine 26 and its engine core 24 from an airflow inlet 48 into the core flowpath 46 to a combustion products exhaust 50 from the core flowpath 46. More particularly, the core flowpath 46 extends from the core inlet 48, sequentially through the compressor section 32, the combustor section 33 and the turbine section 34, to the core exhaust 50. Within the compressor section 32, the core flowpath 46 extends longitudinally across the compressor rotor 36. Within the turbine section 34, the core flowpath 46 extends longitudinally across the first turbine rotor 37 and the second turbine rotor 38.

During operation of the turbine engine 26, air is directed into the engine core 24 through the core inlet 48. This air entering the core flowpath 46 may be referred to as core air. This core air is compressed by the compressor rotor 36 and directed into a combustion chamber 52 (e.g., an annular combustion chamber) within a combustor 54 (e.g., an annular combustor) of the combustor section 33. Fuel is injected into the combustion chamber 52 by one or more fuel injectors 56 and mixed with the compressed core air to provide a fuel-air mixture. This fuel-air mixture is ignited and combustion products thereof flow through and drive sequentially rotation of the first turbine rotor 37 and the second turbine rotor 38. The rotation of first turbine rotor 37 and the second turbine rotor 38 drives rotation of the compressor rotor 36 and, thus, the compression of the air received from the core inlet 48. The rotation of the first turbine rotor 37 and the second turbine rotor 38 also drives rotation of the driven rotor 28 through the drivetrain 42. Where the driven rotor 28 is configured as the propulsor rotor, the rotation of this propulsor rotor propels additional air (e.g., outside of the engine core 24 and its core flowpath 46) to provide aircraft thrust and/or aircraft lift. Where the driven rotor 28 is configured as the generator rotor, the rotation of this generator rotor may facilitate generation of electricity.

The turbine engine 26 is described above as a single spool turbine engine for ease of description. The present disclosure, however, is not limited to such an exemplary turbine engine. The turbine engine 26, for example, may alternatively be configured with one or more additional rotating assemblies (e.g., spools). The rotating assembly 40, for example, may be configured as a high speed rotating assembly, and an additional low speed rotating assembly may be coupled to the driven rotor 28 by the drivetrain 42. In still other embodiments, it is contemplated the rotating assembly 40 may be configured with an aircraft engine other than a turbine engine. The rotating assembly 40, for example, may alternatively be configured with a turbo-compound intermittent internal combustion engine; e.g., a rotary engine (e.g., a Wankel engine) or a reciprocating piston engine.

Figure 2:
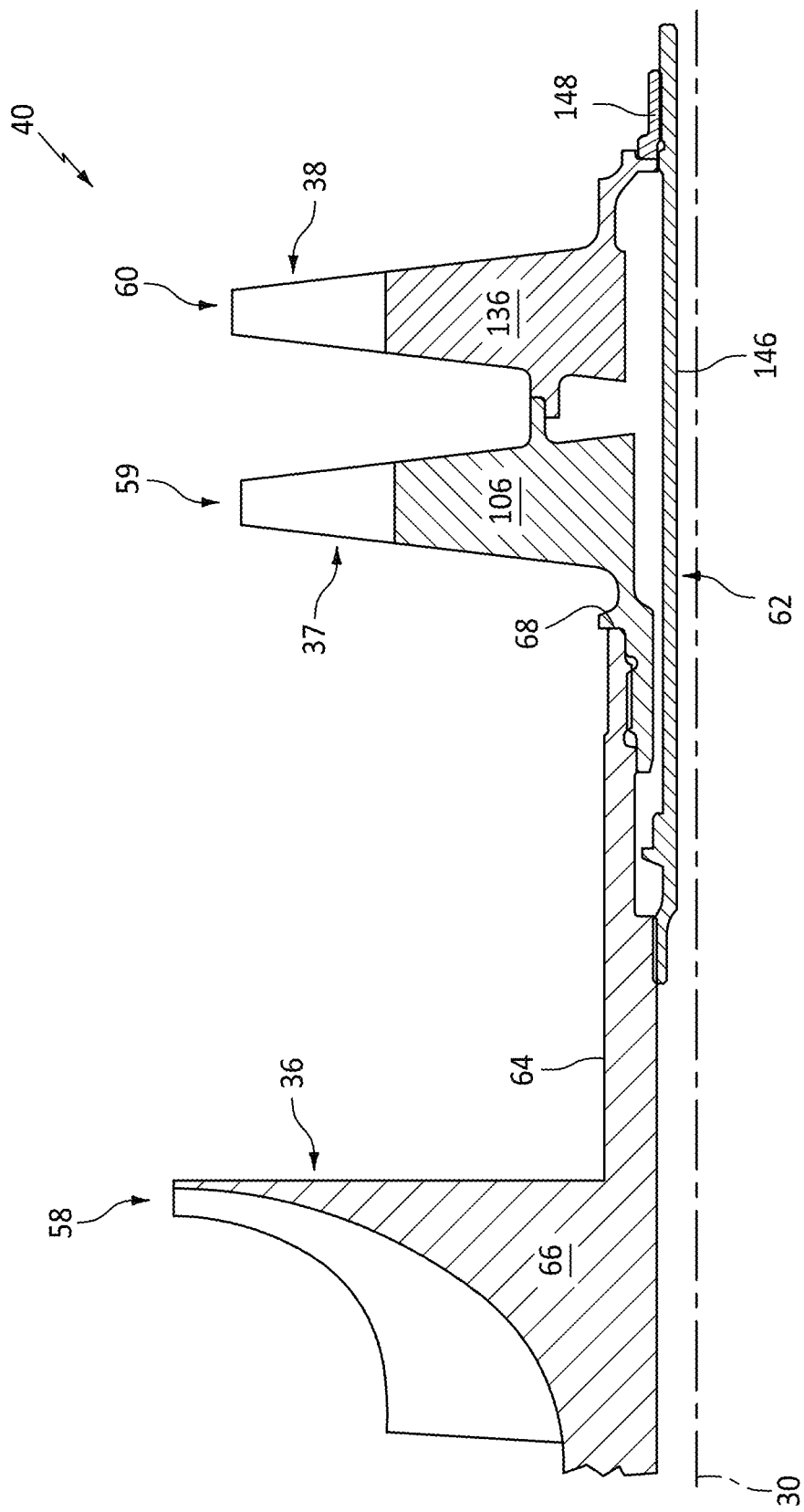
FIG. 2 is a partial sectional illustration of an engine rotating assembly.

The rotating assembly 40 of FIG. 2 includes a compressor rotating structure 58 and one or more turbine rotating structures 59 and 60. This rotating assembly 40 also includes a tie shaft assembly 62 for structurally tying and securing the engine rotating structures 58-60 together.

The compressor rotating structure 58 includes the compressor rotor 36 and a compressor structure shaft 64. The compressor structure shaft 64 is connected to (e.g., formed integral with or otherwise attached to) the compressor rotor 36 and its compressor rotor base 66. The compressor structure shaft 64 projects axially out from the compressor rotor 36 and its compressor rotor base 66 along the axis 30 to an axial distal end 68 of the compressor structure shaft 64. This compressor shaft distal end 68 may also be an axial distal end of the compressor rotating structure 58.

Figure 3:
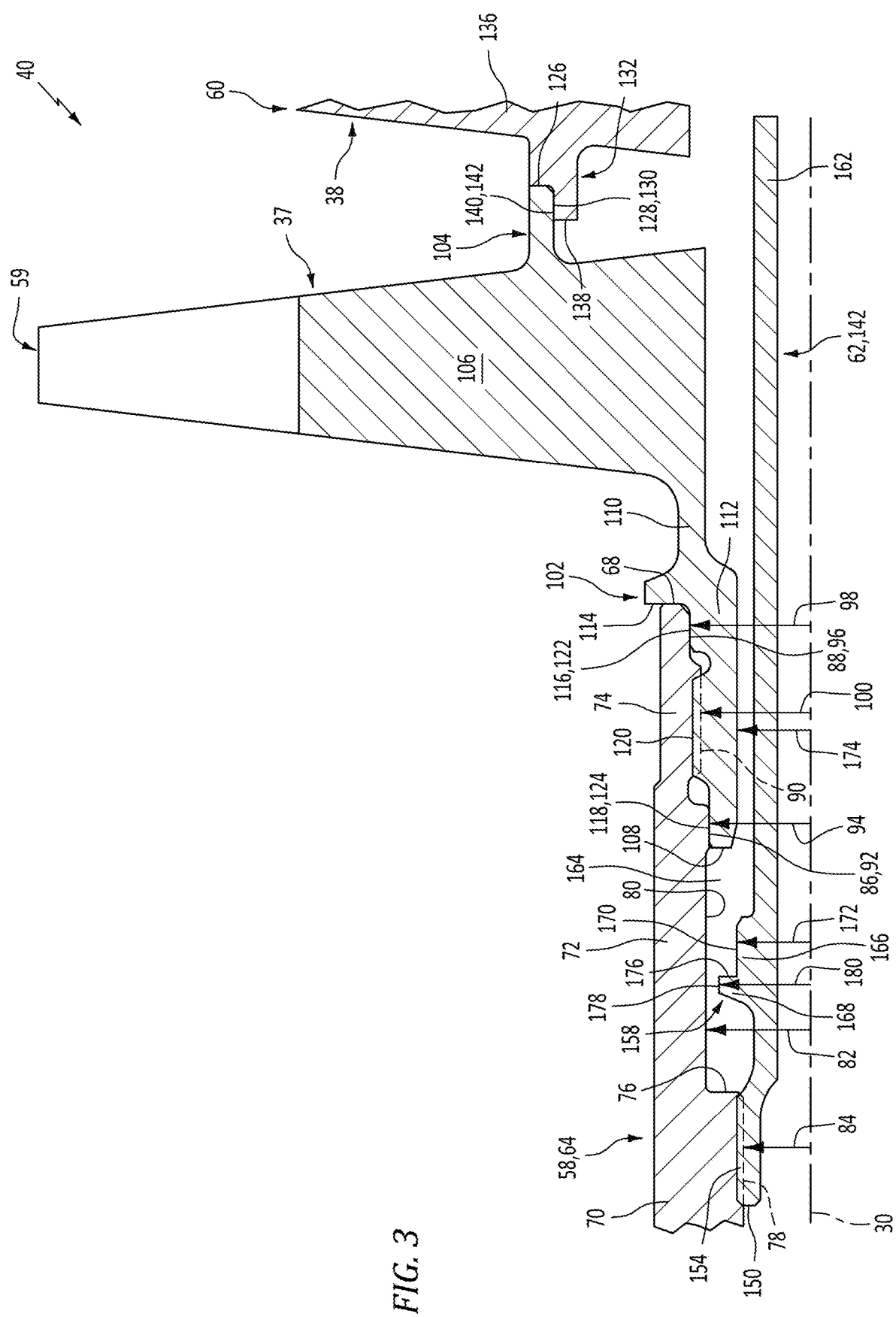
FIG. 3 is a sectional illustration of a first portion of the engine rotating assembly.

The compressor structure shaft 64 of FIG. 3 includes a compressor shaft base 70, a compressor shaft extension 72 and a compressor shaft mount 74. The compressor shaft base 70 extends axially along the axis 30 to an annular shoulder 76 of the compressor structure shaft 64. The compressor shaft base 70 includes an inner (e.g., inward facing) threaded region 78 axially adjacent the compressor shaft shoulder 76.

The compressor shaft extension 72 projects axially along the axis 30 out from the compressor shaft base 70 to the compressor shaft mount 74. The compressor shaft extension 72 includes a cylindrical inner surface 80 axially adjacent the compressor shaft shoulder 76. The shaft extension inner surface 80 of FIG. 3, for example, projects axially out from the compressor shaft shoulder 76 to (or about) the compressor shaft mount 74. With this arrangement, an inner radius 82 of the shaft extension inner surface 80 from the axis 30 to the shaft extension inner surface 80 is sized larger than an inner radius 84 of the shaft base threaded region 78 from the axis 30 to the shaft base threaded region 78.

The compressor shaft mount 74 projects axially along the axis 30 out from the compressor shaft extension 72 to the compressor shaft end 68. The compressor shaft mount 74 includes one or more inner (e.g., inward facing) lands 86 and 88 and an inner (e.g., inward facing) splined region 90.

The first shaft mount inner land 86 may be disposed axially adjacent the compressor shaft extension 72 and its shaft extension inner surface 80. The first shaft mount inner land 86 has a cylindrical inner surface 92 with an inner radius 94 from the axis 30 to the first shaft mount inner land 86. The first shaft mount inner land radius 94 is sized larger than the shaft base threaded region radius 84 and may be (e.g., slightly) smaller than the shaft extension inner surface radius 82.

The second shaft mount inner land 88 may be disposed at the compressor shaft end 68. The second shaft mount inner land 88 has a cylindrical inner surface 96 with an inner radius 98 from the axis 30 to the second shaft mount inner land 88. The second shaft mount inner land radius 98 is sized larger than the first shaft mount inner land radius 94.

The shaft mount inner splined region 90 is arranged axially between the first shaft mount inner land 86 and the second shaft mount inner land 88. The shaft mount inner splined region 90 has an inner radius 100 from the axis 30 to the shaft mount inner splined region 90. This shaft mount inner splined region radius 100 is larger than the first shaft mount inner land radius 94 and is smaller than the second shaft mount inner land radius 98.

The first turbine rotating structure 59 includes the first turbine rotor 37, a first turbine structure shaft 102 and a first turbine structure coupler 104. The first turbine rotor 37 and its first turbine rotor base 106 are disposed axially between the first turbine structure shaft 102 and the first turbine structure coupler 104.

The first turbine structure shaft 102 is connected to (e.g., formed integral with or otherwise attached to) the first turbine rotor 37 and its first turbine rotor base 106. The first turbine structure shaft 102 projects axially out from the first turbine rotor 37 and its first turbine rotor base 106 along the axis 30 to an axial distal end 108 of the first turbine structure shaft 102. This first turbine shaft end 108 may also be an axial distal first end of the first turbine rotating structure 59.

The first turbine structure shaft 102 of FIG. 3 includes a first turbine shaft base 110 and a first turbine shaft mount 112. The first turbine shaft base 110 extends axially along the axis 30 to an annular shoulder 114 of the first turbine structure shaft 102.

The first turbine shaft mount 112 projects axially along the axis 30 out from the first turbine shaft base 110 to the first turbine shaft end 108. The first turbine shaft mount 112 includes one or more outer (e.g., outward facing) lands 116 and 118 and an outer (e.g., outward facing) splined region 120.

The first shaft mount outer land 116 may be disposed axially adjacent the first turbine shaft base 110 and its first turbine shaft shoulder 114. The first shaft mount outer land 116 has a cylindrical outer surface 122. This first shaft mount outer land 116 is mated with the second shaft mount inner land 88 such that the first mount land outer surface 122 radially engages (e.g., is abutted against, contacts) the second mount land inner surface 96. More particularly, the first shaft mount outer land 116 is sized and configured such that a radial interface between the first shaft mount outer land 116 and the second shaft mount inner land 88 provides an outer shaft-to-shaft tight-fit connection between the first turbine structure shaft 102 and the compressor structure shaft 64.

The second shaft mount outer land 118 may be disposed at the first turbine shaft end 108. The second shaft mount outer land 118 has a cylindrical outer surface 124. This second shaft mount outer land 118 is mated with the first shaft mount inner land 86 such that the second mount land outer surface 124 radially engages (e.g., is abutted against, contacts) the first mount land inner surface 92. More particularly, the second shaft mount outer land 118 is sized and configured such that a radial interface between the second shaft mount outer land 118 and the first shaft mount inner land 86 provides an inner shaft-to-shaft tight-fit connection between the first turbine structure shaft 102 and the compressor structure shaft 64.

The shaft mount outer splined region 120 is arranged axially between the first shaft mount outer land 116 and the second shaft mount outer land 118. The shaft mount outer splined region 120 is mated with the shaft mount inner splined region 90 such that splines of the shaft mount outer splined region 120 are meshed together with splines of the shaft mount inner splined region 90. With this arrangement, a splined connection is provided between the first turbine structure shaft 102 and the compressor structure shaft 64 to rotationally lock the first turbine structure shaft 102 to the compressor structure shaft 64.

The first turbine structure coupler 104 is connected to (e.g., formed integral with or otherwise attached to) the first turbine rotor 37 and its first turbine rotor base 106. The first turbine structure coupler 104 projects axially out from the first turbine rotor 37 and its first turbine rotor base 106 along the axis 30 to an axial distal end 126 of the first turbine structure coupler 104, which first turbine coupler end 126 is disposed axially opposite the first turbine shaft end 108. The first turbine coupler end 126 may also be an axial distal second end of the first turbine rotating structure 59.

The first turbine structure coupler 104 includes an inner (e.g., inward facing) land 128. This coupler inner land 128 is disposed axially adjacent the first turbine coupler end 126. The structure coupler inner land 128 has a cylindrical inner surface 130.

Figure 4:
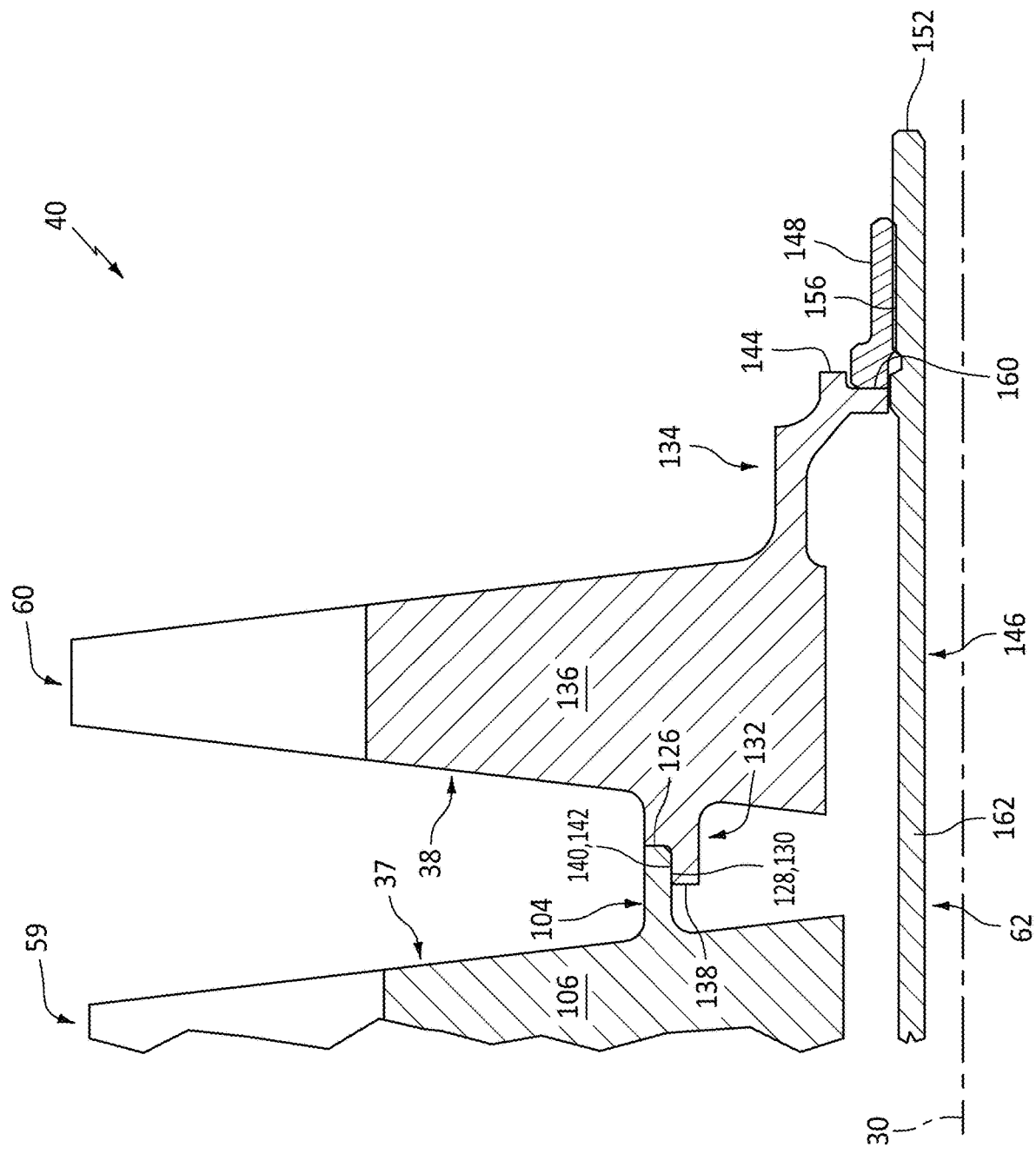
FIG. 4 is a sectional illustration of a second portion of the engine rotating assembly.

The second turbine rotating structure 60 of FIG. 4 includes the second turbine rotor 38, a second turbine structure coupler 132 and a second turbine structure mount 134. The second turbine rotor 38 and its second turbine rotor base 136 are disposed axially between the second turbine structure coupler 132 and the second turbine structure mount 134.

The second turbine structure coupler 132 is connected to (e.g., formed integral with or otherwise attached to) the second turbine rotor 38 and its second turbine rotor base 136. The second turbine structure coupler 132 projects axially out from the second turbine rotor 38 and its second turbine rotor base 136 along the axis 30 to an axial distal end 138 of the second turbine structure coupler 132. The second turbine coupler end 138 may also be an axial distal first end of the second turbine rotating structure 60.

The second turbine structure coupler 132 includes an outer (e.g., outward facing) land 140. This coupler outer land 140 is disposed axially adjacent the second turbine coupler end 138. The coupler outer land 140 has a cylindrical outer surface 142. This coupler outer land 140 is mated with the coupler inner land 128 such that the coupler land outer surface 142 radially engages (e.g., is abutted against, contacts) the coupler land inner surface 130. More particularly, the coupler outer land 140 is sized and configured such that a radial interface between the coupler outer land 140 and the coupler inner land 128 provides a coupler-to-coupler tight-fit connection between the second turbine structure coupler 132 and the first turbine structure coupler 104.

The second turbine structure mount 134 is connected to (e.g., formed integral with or otherwise attached to) the second turbine rotor 38 and its second turbine rotor base 136. The second turbine structure mount 134 projects axially out from the second turbine rotor 38 and its second turbine rotor base 136 along the axis 30 to an axial distal end 144 of the second turbine structure mount 134, which second turbine mount end 144 is disposed axially opposite the second turbine coupler end 138. The second turbine mount end 144 may also be an axial distal second end of the second turbine rotating structure 60.

Figure 5:
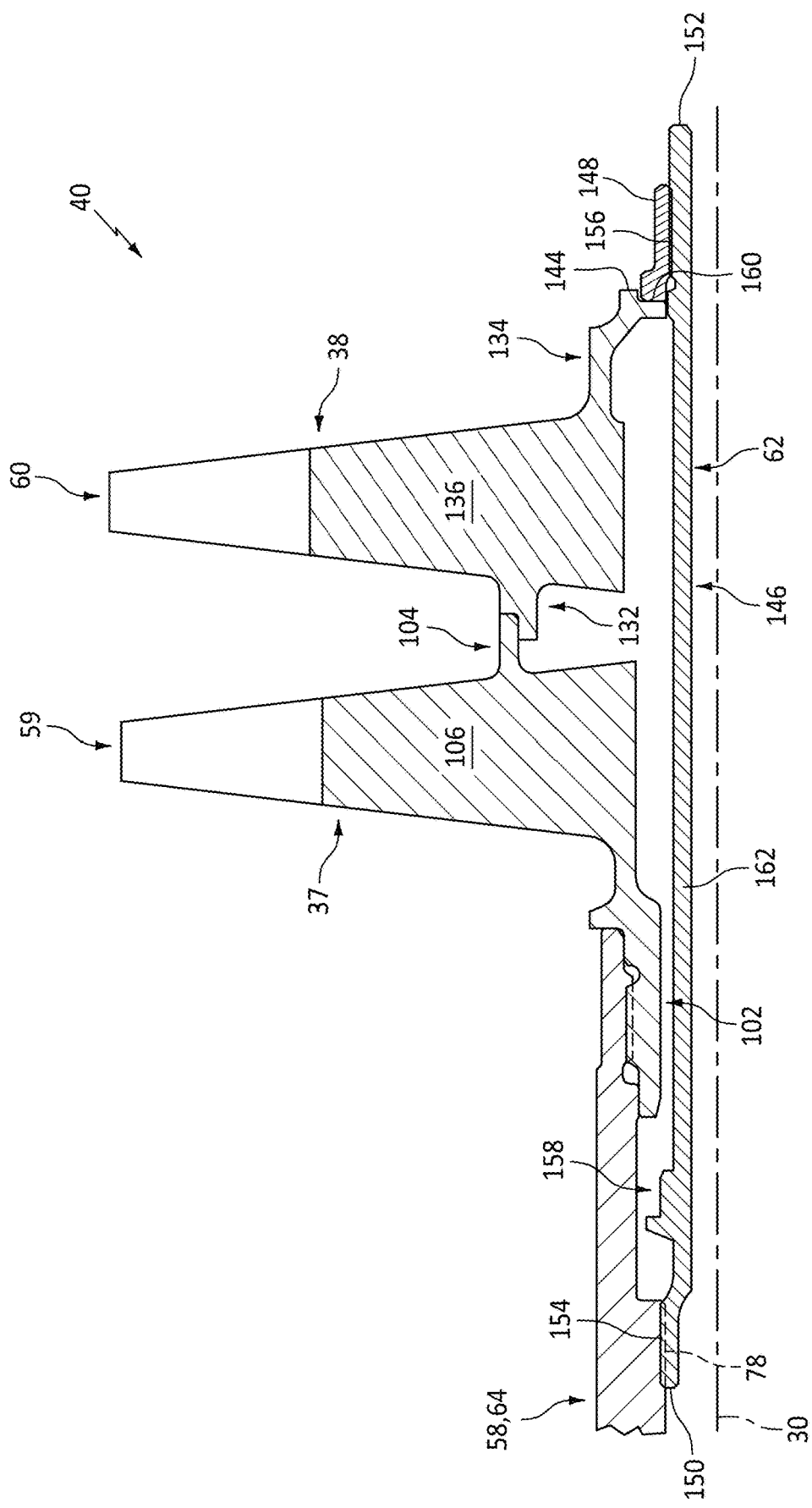
FIG. 5 is a partial sectional illustration of the engine rotating assembly along a tie shaft.

Referring to FIG. 5, the tie shaft assembly 62 includes a tie shaft 146 and a nut 148. The tie shaft 146 extends axially along the axis 30 from an axial distal first end 150 of the tie shaft 146 to an axial distal second end 152 of the tie shaft 146. The tie shaft 146 of FIG. 5 includes one or more outer (e.g., outward facing) threaded regions 154 and 156 and an annular protrusion 158; e.g., a pulling feature.

The tie shaft first threaded region 154 may be disposed at or near the tie shaft first end 150. This tie shaft first threaded region 154 is mated with the shaft base threaded region 78. The tie shaft first threaded region 154, for example, is threaded into the shaft base threaded region 78 to provide a shaft-to-shaft threaded connection between the tie shaft 146 and the compressor structure shaft 64.

The tie shaft second threaded region 156 may be disposed at or near the tie shaft second end 152. The nut 148 is mated with the tie shaft second threaded region 156. The nut 148, for example, is threaded onto the tie shaft second threaded region 156 to provide a nut-to-shaft threaded connection between the nut 148 and the tie shaft 146. Here, the nut 148 axially engages (e.g., abuts against, contacts) an annular shoulder 160 of the second turbine structure mount 134 at (or near) its second turbine mount end 144. With this arrangement, the first turbine rotating structure 59 and the second turbine rotating structure 60 are captured axially between the compressor rotating structure 58 and the nut 148 in a stack. The first turbine rotating structure 59 and the second turbine rotating structure 60 may also be clamped axially between the compressor rotating structure 58 and the nut 148 so as to maintain the connections between the rotating structures 58-60. The tie shaft 146 may thereby structurally tie the first turbine rotating structure 59 and the second turbine rotating structure 60 to the compressor rotating structure 58. Here, the tie shaft 146 of FIG. 5 projects axially along the axis 30 through an internal bore of the second turbine rotating structure 60, through an internal bore of the first turbine rotating structure 59, and partially into an internal bore of the compressor rotating structure 58.

The tie shaft protrusion 158 is disposed axially between the tie shaft threaded regions 154 and 156, proximate the tie shaft first threaded region 154. Referring to FIG. 3, the tie shaft protrusion 158 projects radially out from a tubular base 162 of the tie shaft 146 into a gap 164; e.g., an air gap. Briefly, the gap 164 projects radially into an assembly of the rotating structures 58 and 59 to the shaft extension inner surface 80. The gap 164 extends axially within the assembly of the rotating structures 58 and 59 between and to the compressor shaft shoulder 76 and the first turbine shaft end 108. The gap 164 also extends circumferentially about the axis 30 within the assembly of the rotating structures 58 and 59, providing the gap 164 with a full-hoop (e.g., annular) geometry. The tie shaft protrusion 158 of FIG. 5 includes a protrusion guide 166 and a protrusion rim 168.

The protrusion guide 166 is connected to (e.g., formed integral with or otherwise attached to) the tie shaft base 162. The protrusion guide 166 extends axially along the tie shaft base 162 between opposing axial ends of the tie shaft protrusion 158. The protrusion guide 166 projects radially out from the tie shaft base 162 to a cylindrical outer surface 170 of the protrusion guide 166. This guide outer surface 170 extends axially between and to the protrusion rim 168 and the protrusion second end. The guide outer surface 170 has an outer radius 172 from the axis 30 to the guide outer surface 170. The guide surface outer radius 172 is sized (e.g., slightly) smaller than an inner radius 174 (e.g., an innermost radius) of the first turbine structure shaft 102 and its first turbine shaft mount 112 at a location axially aligned with the outer shaft-to-shaft tight-fit connection, the inner shaft-to-shaft tight-fit connection and/or the splined connection.

The protrusion rim 168 is connected to (e.g., formed integral with or otherwise attached to) the protrusion guide 166. The protrusion rim 168 extends axially along the protrusion guide 166 from the protrusion first end to an annular shoulder 176 of the tie shaft protrusion 158. The protrusion rim 168 projects radially out from the protrusion guide 166 and its guide outer surface 170 into the gap 164 to a radial outer distal end 178 of the tie shaft protrusion 158. Here, the protrusion shoulder 176 also projects radially out from the guide outer surface 170 to the protrusion distal end 178. The protrusion distal end 178 has an outer radius 180 from the axis 30 to the protrusion distal end 178. This protrusion distal end radius 180 is sized larger than the first turbine shaft mount radius 174 and the shaft base threaded region radius 84. The protrusion distal end radius 180 is sized smaller than the shaft extension inner surface radius 82 and the first shaft mount inner land radius 94. The tie shaft protrusion 158 and its protrusion distal end 178 are thereby radially spaced inward from the shaft extension inner surface 80. The tie shaft protrusion 158 and its members 166 and 168 are also spaced axially apart from the compressor shaft shoulder 76 and the first turbine shaft end 108 by respective portions of the gap 164. The tie shaft protrusion 158 and its members 166 and 168 may thereby be axially and radially disengaged from other proximate turbine engine components when the tie shaft 146 is assembled with the rotating structures 58-60.

Figure 6:
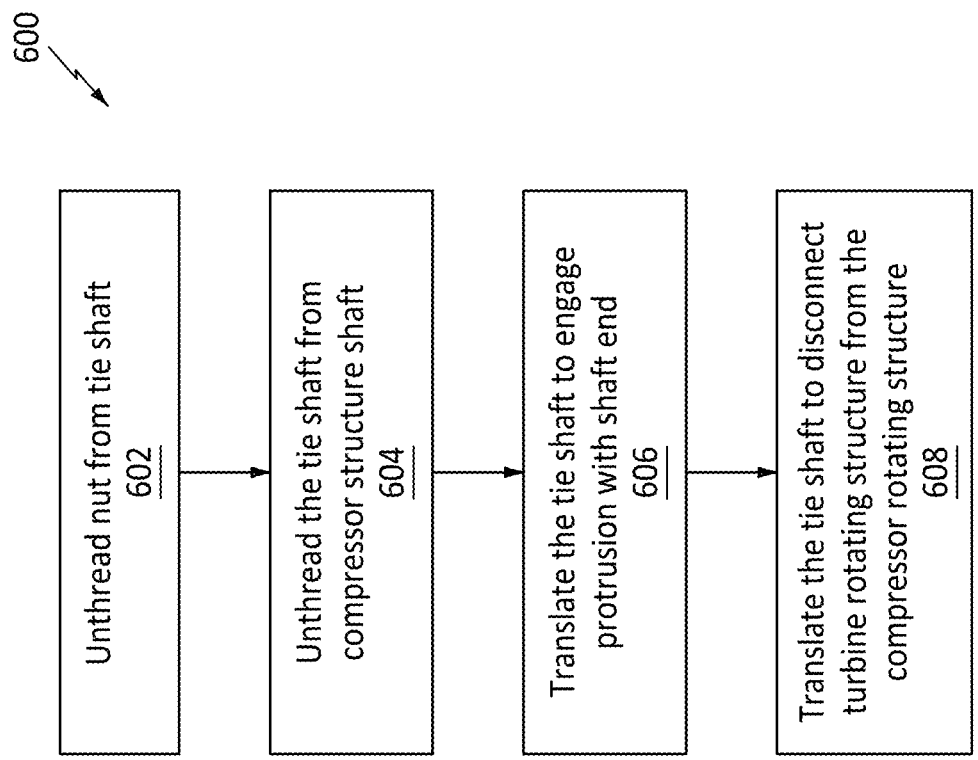
FIG. 6 is a flow diagram of a method for disassembling an engine rotating assembly.

FIG. 6 is a flow diagram of a method 600 for disassembling an assembly of the turbine engine 26. For case of description, the turbine engine assembly disassembled by the method 600 is described below as the engine rotating assembly 40. The method 600 of the present disclosure, however, is not limited to disassembling such an exemplary turbine engine assembly.

Figure 7A:
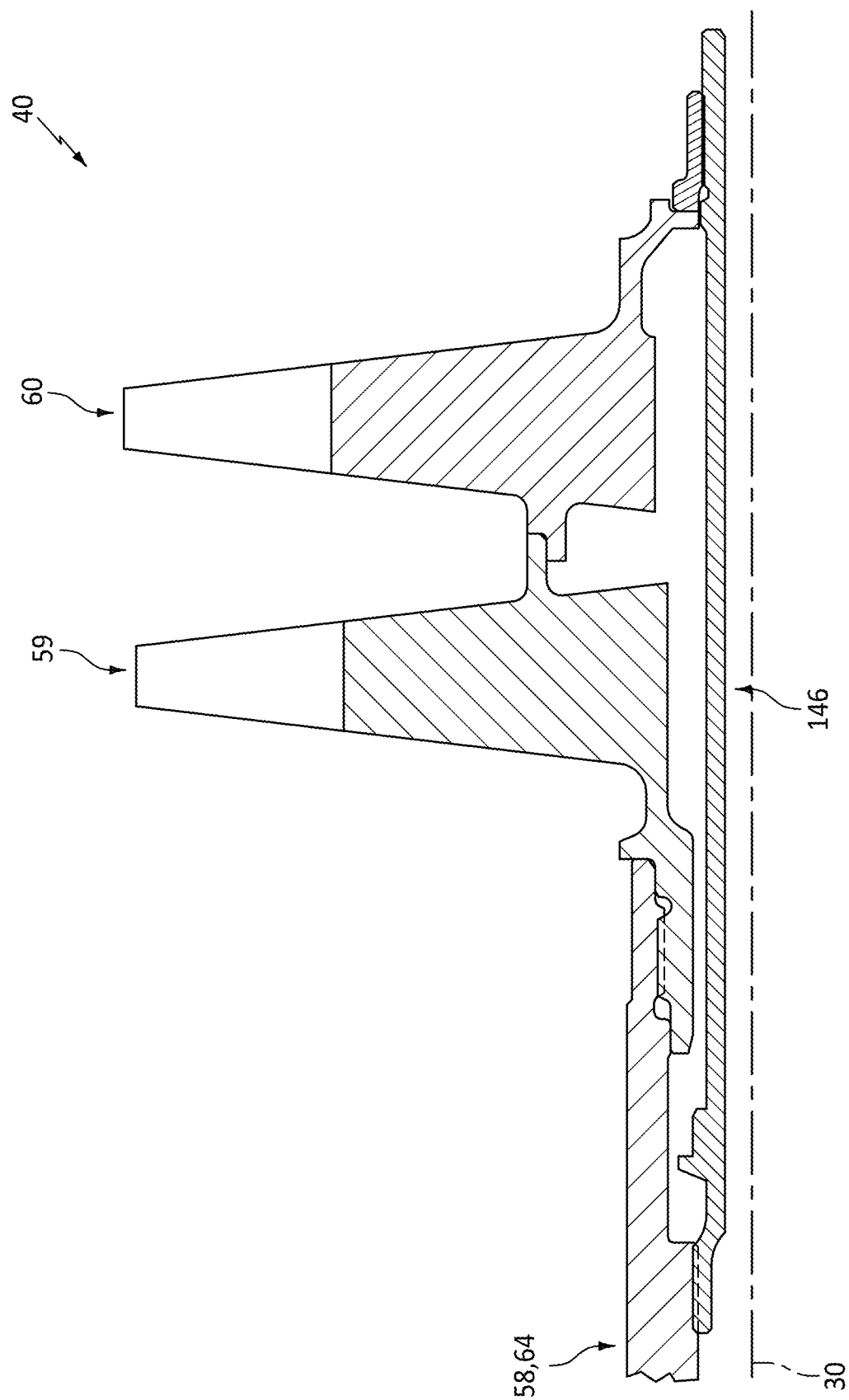
FIGS. 7A-D are partial sectional illustrations that depict a sequence for disassembling the engine rotating assembly.

In step 602, referring to FIG. 7A, the nut 148 (see FIG. 5) is unthreaded from the tie shaft 146.

Figure 7B:
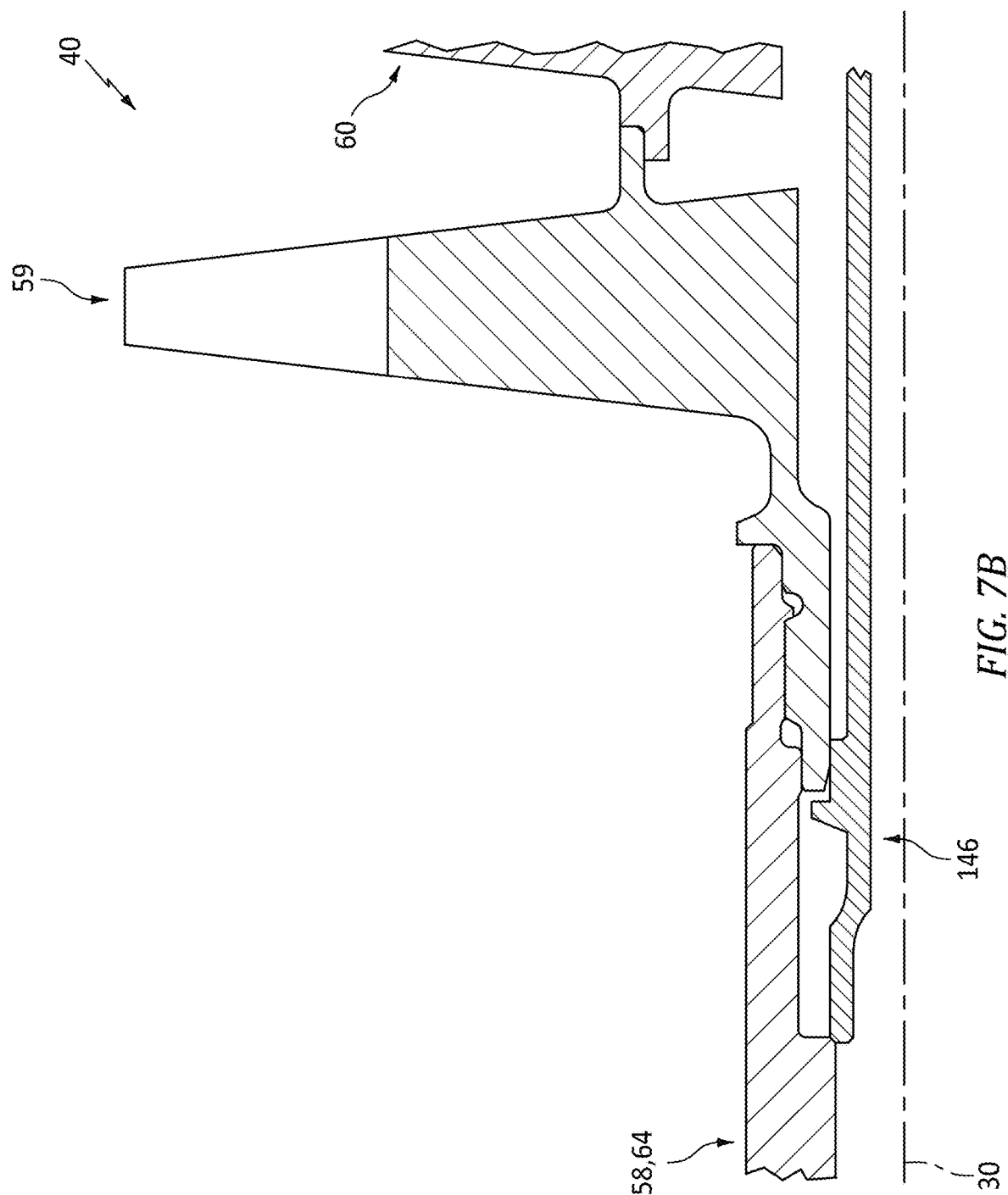

In step 604, referring to FIG. 7B, the tie shaft 146 is unthreaded from the compressor structure shaft 64.

Figure 7C:
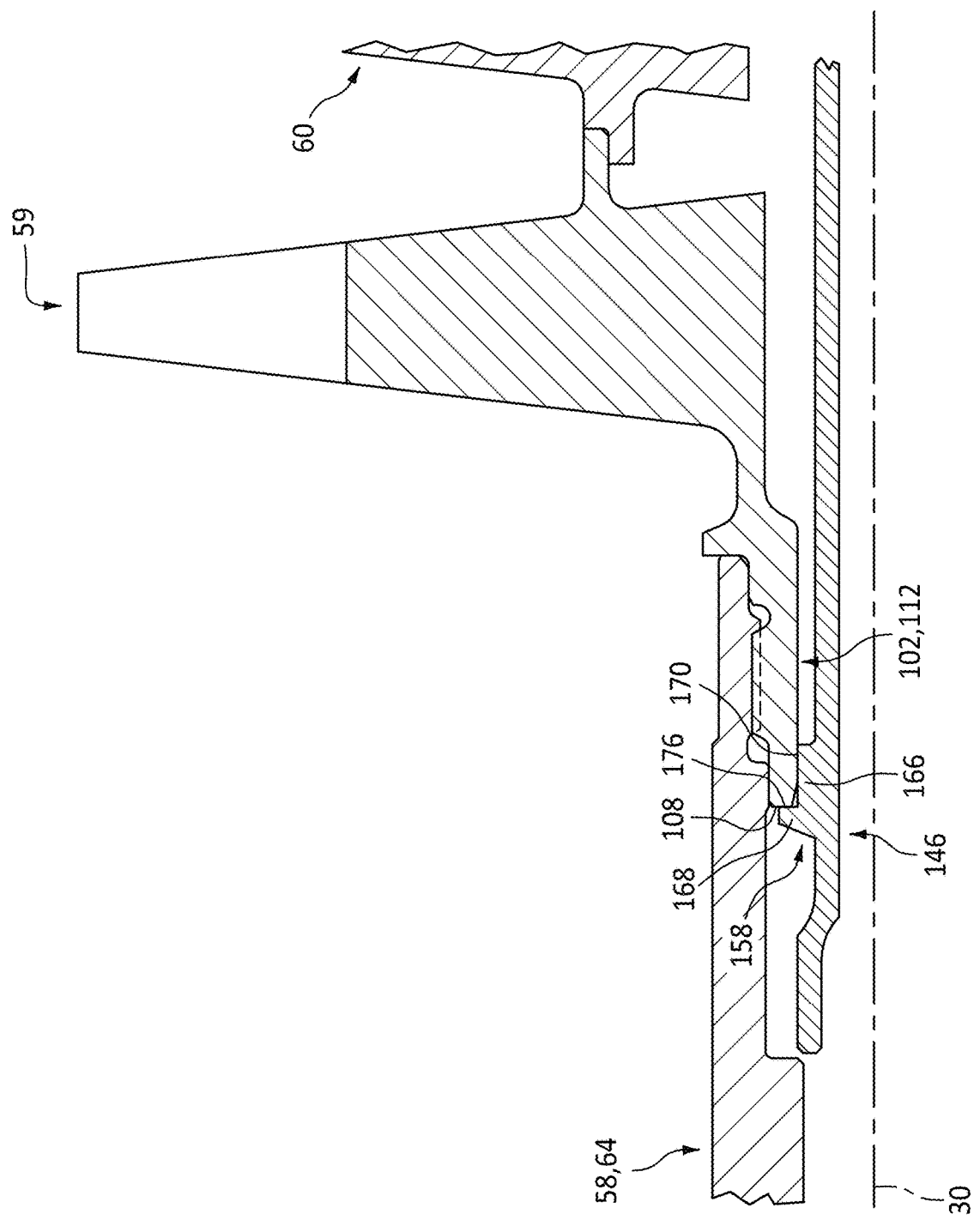

In step 606, referring to FIG. 7C, the tie shaft 146 is translated axially along the axis 30 to engage the first turbine rotating structure 59. The tie shaft 146, for example, may be translated axially until the protrusion rim 168 and protrusion shoulder 176 axially engage (e.g., abut against, contact) the first turbine structure shaft 102 and its first turbine shaft end 108. Here, the guide outer surface 170 may be in close radial proximity to or may radially engage the first turbine structure shaft 102 and its first turbine shaft mount 112. This engagement may maintain coaxial alignment between the tie shaft 146 and the first turbine rotating structure 59 proximate the tie shaft first end 150.

Figure 7D:
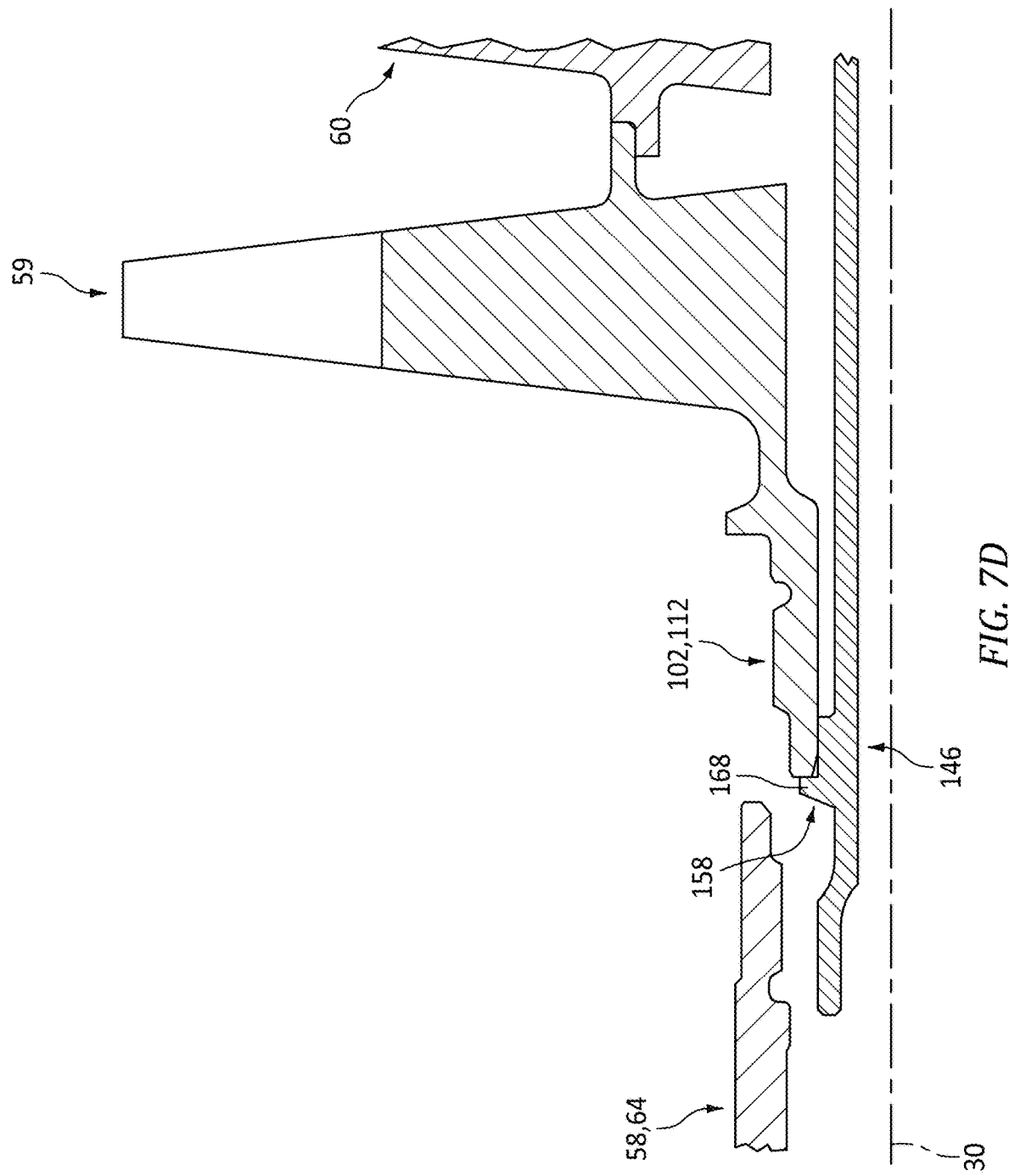

In step 608, referring to FIG. 7D, the tie shaft 146 is further axially translated along the axis 30 to disconnect the first turbine rotating structure 59 from the compressor rotating structure 58. For example, by pulling the tie shaft 146 axially away from the compressor rotating structure 58, the tie shaft protrusion 158 and its protrusion rim 168 may pull the first turbine shaft mount 112 axially away from the compressor rotating structure 58. Moreover, by pulling against the first turbine rotating structure 59 with the tie shaft 146, the first turbine rotating structure 59 may be disconnected from the compressor rotating structure 58 while the second turbine rotating structure 60 remains connected to the first turbine rotating structure 59. Thus, the first turbine rotating structure 59 and the second turbine rotating structure 60 may be removed as a module using the tie shaft 146.

In some embodiments, referring to FIG. 2, one, some or all of the engine rotating structures 58, 59 and/or 60 may each be configured as a single monolithic body. Each engine rotating structure 58, 59, 60, for example, may be cast, machined, additively manufactured and/or otherwise formed as a single, unitary body. By contrast, a non-monolithic body may include discretely formed elements which (e.g., removably) attached to one another following the formation thereof. The present disclosure, however, is not limited to such exemplary manufacturing techniques.

In some embodiments, the engine rotating assembly 40 may include the two turbine rotating structures 59 and 60 stacked between the compressor rotating structure 58 and the nut 148. It is contemplated, however, the rotating assembly 40 may also include one or more additional turbine rotating structures between the second turbine rotating structure 60 and the nut 148. Moreover, while the first turbine rotating structure 59 and the tie shaft 146 are described above as be connected to the compressor rotating structure 58, it is contemplated the first turbine rotating structure 59 and the tie shaft 146 may alternatively be connected to another rotating structure of the turbine engine 26.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for an engine, comprising:
a first rotating structure including a first structure bore and a first structure shaft;
a second rotating structure including a second structure bore, a second structure shaft, a second structure coupler and a bladed second structure rotor axially between the second structure shaft and the second structure coupler, the second structure shaft mounted to the first structure shaft at a shaft-to-shaft tight-fit connection, and a distal end of the first structure shaft axially engaging a shoulder of the second structure shaft;
a third rotating structure including a third structure bore, a third structure coupler, a third structure mount and a bladed third structure rotor axially between the third structure coupler and the third structure mount, and the third structure coupler mounted to the second structure coupler at a coupler-to-coupler tight-fit connection;
a tie shaft projecting axially through the third structure bore, the second structure bore and into the first structure bore, the tie shaft attached to the first structure shaft at a first threaded connection, the tie shaft comprising a protrusion that projects radially outward into a gap axially between the first structure shaft and the second structure shaft, the gap formed by and extending axially between a shoulder of the first structure shaft and a distal end of the second structure shaft; and
a nut mounted to the tie shaft at a second threaded connection and abutted axially against the third structure mount, the second rotating structure and the third rotating structure stacked axially between the first rotating structure and the nut.

2. The apparatus of claim 1, wherein the protrusion is axially spaced from the shoulder of the first structure shaft by a portion of the gap.

3. The apparatus of claim 1, wherein the protrusion is axially spaced from the distal end of the second structure shaft by a portion of the gap.

4. The apparatus of claim 3, wherein, during disassembly of the second rotating structure from the first rotating structure, the protrusion is configured to axially engage the distal end of the second structure shaft to pull the second structure shaft axially apart from the first structure shaft.

5. The apparatus of claim 1, wherein, during disassembly of the apparatus, the tie shaft is configured to pull the second structure shaft axially apart from the first structure shaft while maintaining the coupler-to-coupler tight-fit connection.

6. The apparatus of claim 1, wherein
the protrusion includes a guide and a rim; and
the rim projects radially outward from the guide into the gap.

7. The apparatus of claim 6, wherein
the second structure shaft has a second structure shaft inner radius at a location axially aligned with the shaft-to-shaft tight-fit connection;
the guide has a guide outer radius that is smaller than the second structure shaft inner radius; and
the rim has a rim outer radius that is larger than the second structure shaft inner radius.

8. The apparatus of claim 6, wherein
the guide has a cylindrical outer surface axially adjacent the rim; and
an axial length of the cylindrical outer surface is larger than an axial thickness of the rim.

9. The apparatus of claim 1, wherein the shaft-to-shaft tight fit tight-fit connection is a first shaft-to-shaft tight-fit connection, and the second structure shaft is further mounted to the first structure shaft at a second shaft-to-shaft tight-fit connection that is axially offset from the first shaft-to-shaft tight-fit connection.

10. The apparatus of claim 9, wherein the second structure shaft is further mounted to the first structure shaft at a spline connection axially between the first shaft-to-shaft tight-fit connection and the second shaft-to-shaft tight-fit connection.

11. The apparatus of claim 1, wherein the second structure shaft is further mounted to the first structure shaft at a spline connection.

12. The apparatus of claim 1, wherein
the bladed second structure rotor comprises a first turbine rotor; and
the bladed third structure rotor comprises a second turbine rotor.

13. The apparatus of claim 1, wherein the first rotating structure further includes a compressor rotor.

14. The apparatus of claim 1, wherein the first rotating structure, the second rotating structure and the third rotating structure are each configured as a monolithic body.

15. An apparatus for an engine, comprising:
a rotating assembly rotatable about an axis, the rotating assembly including a first rotating structure, a second rotating structure and a tie shaft;
the first rotating structure including a first structure bore and a first structure shaft;
the second rotating structure including a second structure bore, a second structure shaft, a second structure coupler and a bladed second structure rotor axially between the second structure shaft and the second structure coupler, the second structure shaft mounted to the first structure shaft at a shaft-to-shaft tight-fit connection, and the second structure shaft having a second structure shaft inner radius at a location axially aligned with the shaft-to-shaft tight-fit connection; and
the tie shaft projecting axially through the second structure bore and into the first structure bore, the tie shaft attached to the first structure shaft at a threaded connection, the tie shaft comprising a protrusion that projects radially outward into a gap axially between the first structure shaft and the second structure shaft, the protrusion including a guide and a rim projecting radially out from the guide, the guide having a guide outer radius that is smaller than the second structure shaft inner radius, and the rim having a rim outer radius that is larger than the second structure shaft inner radius;
wherein the gap is formed by and extends axially between a shoulder of the first structure shaft and a distal end of the second structure shaft;
wherein the protrusion is axially spaced from the shoulder of the first structure shaft;
wherein the protrusion is axially spaced from the distal end of the second structure shaft; and
wherein the protrusion is radially disengaged from the first rotating structure.

16. A disassembly method, comprising:
unthreading a nut from a tie shaft, wherein, prior to the unthreading of the nut, the tie shaft is threaded into a first rotating structure, a second rotating structure is mounted to the first rotating structure by a first tight-fit connection, a third rotating structure is mounted to the second rotating structure by a second tight-fit connection, and the second rotating structure and the third rotating structure are axially stacked and secured between the first rotating structure and the nut;

unthreading the tie shaft from the first rotating structure;
axially translating the tie shaft to abut a shoulder of the tie shaft against an axial distal end of the second rotating structure; and
further axially translating the tie shaft to disconnect the second rotating structure from the first rotating structure at the first tight-fit connection and pull the second rotating structure away from the first rotating structure while the third rotating structure remains mounted to the second rotating structure by the second tight-fit connection;
wherein the tie shaft comprises a protrusion that projects radially outward into a gap, the protrusion comprises the shoulder of the tie shaft, and the gap is formed by and extends axially between a shoulder of the first rotating structure and the axial distal end of the second rotating structure; and
wherein prior to the unthreading of the tie shaft, the protrusion is axially spaced from the shoulder of the first rotating structure, the protrusion is axially spaced from the axial distal end of the second rotating structure, and the protrusion is radially spaced from the first rotating structure.

* * * * *